Patented June 3, 1947

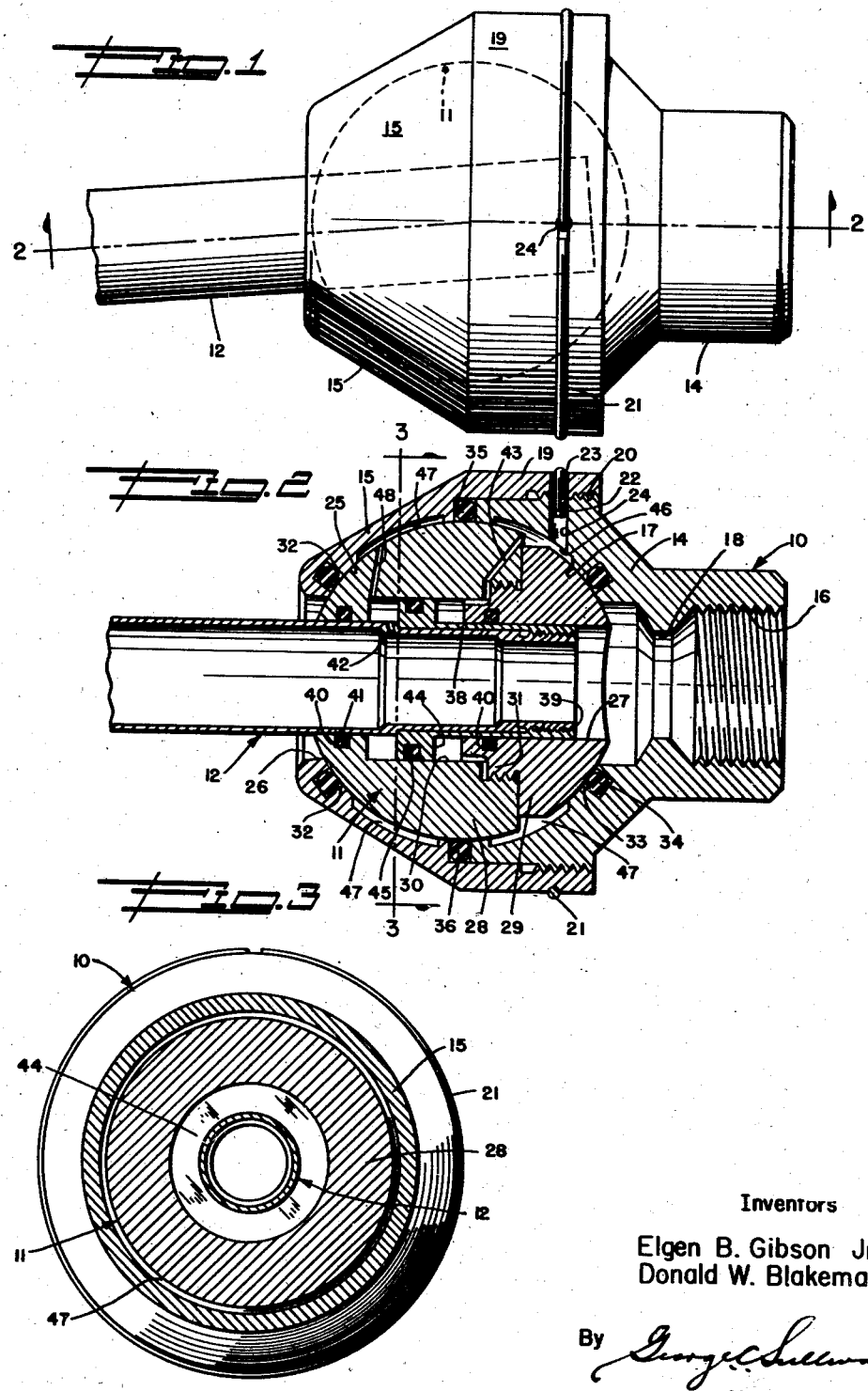

2,421,691

UNITED STATES PATENT OFFICE 2,421,691

UNIVERSAL JOINT

Elgen B. Gibson, Jr., North Hollywood, and Donald W. Blakeman, Altadena, Calif., assignors to Lockheed Aircraft Corporation, Burbank, Calif.

Application September 4, 1943, Serial No. 501,222

3 Claims. (Cl. 285—95)

This invention relates to couplings and joints, and relates more particularly to universal and expansion joints for use in pipe lines, conduits, systems, etc., handling fluids.

A general object of this invention is to provide a simple, practical and very effective pressure balanced combination universal and expansion joint.

Swivel joints, slip joints and universal joints are frequently required in pipe lines, conduits and systems conducting or containing fluid under pressure. Where the fluid is under pressure it is difficult to maintain effective fluid-tight seals between the relatively movable joint parts, and the fluid pressures cause excessive friction between the parts. The excessive friction and resultant resistance to relative movement of the joint parts are due primarily to the unbalanced imposition of the fluid pressures on the joint parts, and so far as we are aware, no universal joint or expansion joint has been introduced in which the fluid pressures are balanced to allow substantially unrestrained relative movement of the joint parts.

It is an important object of the present invention to provide a fluid conducting universal and expansion or slip joint in which the fluid pressures exerted on the relatively movable parts of the joint are balanced to allow relative movement of the parts with a minimum of friction, resistance and distortion.

Another object of the invention is to provide a balanced fluid conducting joint adapted to connect two elements of a line, conduit system, or mechanism for relative universal or angular movement, for relative rotation and for relative axial movement.

Another object of the invention is to provide a combination universal and expansion or slip joint in which the fluid pressures on both the ball member and the axially movable member are balanced so that the ball may move freely in its socket and the slip member is free to move in the ball with a minimum of friction, there being no tendency for the fluid pressures to either separate the relatively movable parts or to force them into movement resisting engagement.

Another object of the invention is to provide a joint of the character referred to in which the sealing or packing means are subjected to a minimum of wear and distortion and are therefore very long lived.

Other objects and features of the invention will be readily understood from the following detailed description of typical preferred forms of the invention throughout which reference will be made to the accompanying drawings in which:

Figure 1 is a plan view of a joint embodying the features of this invention.

Figure 2 is a central longitudinal detailed sectional view of Figure 1, taken on the line 2—2 thereof.

Figure 3 is a transverse detailed sectional view taken as indicated by line 3—3 on Figure 2.

The joint chosen for illustrative purposes may be said to comprise generally a socket 10, a movable ball 11 in the socket 10, an axially movable member 12 engaged in the ball 11 and means for balancing the fluid pressures on the member 12.

The socket 10 is designed to movably contain the ball 11 and is constructed to be readily assembled around the ball. In the preferred construction illustrated, the socket 10 comprises two sections 14 and 15. The section 14 has means for facilitating its connection with a pipe, fitting or the like. We have shown the section 14 provided with an internally threaded boss 16. The forward portion of the section 14 has a cylindrical exterior and the forward end of the section is provided with a spherically curved concave surface 17. A central fluid opening 18 extends from the surface 17 and passes outwardly through the boss 16 to communicate with the pipe or fitting. The outer section 15 of the socket 10 has a tubular flange or wall 19 for engaging around the cylindrical portion of the section 14. Cooperating threads 20 on the telescoping portions of the sections 14 and 15 connect the sections. A lock ring 21 is engaged in an external groove in section 15 and has a finger 22 passing inwardly through a radial opening 23 in the wall of the section 15. The finger 22 cooperates with a radial opening 24 in the section 14 to positively lock the sections 14 and 15 against relative turning. The section 15 has an internal spherically concave surface 25 opposing the surface 17. The surfaces 17 and 25 have a common axis of curvature and are accurately formed and finished. A central opening 26 is provided in the outer end of the section 15 to expose a portion of the ball 11 for the reception of the member 12. In practice, the wall of the opening 26 may be outwardly flared and the inner portion of the opening may be of substantially the same diameter as the opening 18.

The ball 11 is a spherical element arranged within the socket 10. The ball 11 is formed with an accurately finished spherical external surface.

A diametrical opening 27 is provided in the ball 11 to receive the member 12. The opening 27 extends completely through the ball 51 and its inner end communicates with the opening 59. The ball 11 is preferably sectional comprising two parts or sections 28 and 29, to facilitate assembly on the member 12. The section 28 has a longitudinal socket 30 leading to its inner end and has a flat inner face. The section 29 has a flat inner end for abutting the inner end of section 28 and has a boss 31 screw threaded into the end portion of the socket 30. The socket 30 forms a pressure chamber for the means 13 as will be hereinafter described.

Means are provided for sealing between the socket 10 and the ball 11. An annular groove 32 is provided in the surface 25 to be in spaced relation to the opening 26. A similar groove 33 is provided in the surface 17 to be in spaced adjacent relation to the opening 19. Sealing rings 34 of flexible resilient material are arranged in the grooves 32 and 33 to seal with the spherical surface of the ball 11. An internal shoulder is provided on the socket section 25 in spaced opposing relation to the end of the section 14 to leave an annular internal groove 35 in the socket. A sealing ring 36 is provided in the groove 35 to seal with the surface of the ball 11 in a plane spaced midway between the sealing rings 34.

The member 12 is a tubular fluid handling element associated with the ball and socket structure for relative axial movement. The member 12 passes through the opening 26 and extends into the opening 27 of the ball 11. The member 12 is adapted to tilt or have angular movement by reason of its engagement in the ball 11 and the opening 26 is proportioned to allow substantial universal tilting of the member. In addition to this universal movement, the member 12 is adapted to turn in the opening 27 and has limited axial movement in the opening. The outer portion of the member 12 may be formed for ready connection with a conduit section or fitting. The inner portion of the member 12 is reduced in diameter and the extreme inner end portion is internally upset, being provided with a thickened wall. A sleeve 38 engages around the reduced portion of the member 12 and is secured thereto by screw threads 39 at the thickened portion of the member. The sleeve 38 is preferably of the same external diameter as the body of the member 12 to fit the opening 27. Means are provided for sealing between the relatively axially movable ball 11 and member 12. Axially spaced annular grooves 40 are provided in the wall of the opening 27 and carry sealing rings 41 for slidably sealing with the member 12. The sealing rings 34, 36 and 41 may be continuous annular parts of rubber, synthetic rubber, or other flexible resilient packing material of cylindrical cross section and having a diameter slightly greater than the depth of the grooves. The inner end of the tube 12 is open and is in full communication with the opening 19. This permits a free substantially straight flow of fluid through the joint.

The balancing means serves to hydraulically balance the joint elements so that there is a minimum of resistance to their relative movement. This means includes or provides one or more ports 42 in the wall of the tubular member 12 placing the socket or chamber 30 in communication with the interior of the member 12. The port or ports 42 communicate with the inner portion of the chamber 30 beyond the inner end of the sleeve 38. The pressure balancing means further includes a port system for putting the other end of the chamber 30 in communication with the atmosphere. A port 43 extends through the ball 11 from said other end of the chamber 30 to the surface of the ball. A port passes through the telescoping portions of the socket sections 14 and 15 and connects with the port 43 in the manner to be hereinafter described. In practice, the openings 23 and 24 described above, may constitute the port in the socket 10 for connecting the port system of the ball with the atmosphere.

The pressure equalizing means further includes a flange or annular piston 44 on the sleeve 38 for operating in the chamber 30. An annular groove is provided in the periphery of the piston 44 and carries a ring 45 for slidably sealing with the wall of the chamber. It will be seen that one side of the piston 44 is acted on by line pressure and the other side of the piston is acted on by atmospheric pressure. The line pressure acting inwardly on the piston 44 balances the static pressure on the member 12 tending to urge the member out of the ball and socket joint. The chamber 30 is of substantial length to give the piston 44 and member 12 the required axial stroke. The endwise movement of the member 12 may be stopped or limited by the engagement of the piston 44 with the end walls of the cylinder chamber 30.

The means 13 further provides for the equalization, or at least partial equalization, of the pressures on the ball 11. The surface 17 has an annular depression or recess 46 providing a chamber between the surface of the ball 11 and the section 14. The surface 25 has a similar depression or recess, leaving a chamber 47 between the surface of the ball 11 and the inner surface of the section 15. The chambers 46 and 47 may be of identical extent or area. The chambers 46 and 47 are spaced between the spaced sealing rings 34 and 36 and are preferably equally spaced at opposite sides of the medial transverse plane of the joint. A port 48 extends through the ball 11 from the outer end of the cylinder chamber 30 to the chamber 47. The above described port 43 leads from the inner end of the cylinder chamber 30 to the chamber 46. With the structure just described, the ball 11 has substantially equally surfaces at opposite sides of its transverse medial plane subjected to line pressure and atmospheric pressure. In this connection it is to be observed that the sealing rings 34 and 36 are symmetrically arranged in the joint so that equal surface portions of the ball 11 are subjected to line pressures and atmospheric pressure with the ball in any possible position. The atmospheric pressure equalizing chamber 46 serves to connect the port 43 with the vent port 24 in the wall of the socket section 14. The joint is especially well suited to handle compressible fluids and liquids, and is well adapted for situations where temperature and adjustment variations, etc. produce the relative axial movement of the joint elements.

From the foregoing detailed description it will be apparent that the invention provides universal expansion joints suitable for use in lines, systems and mechanisms handling fluid pressures or handling negative or reduced pressures. The joint elements are hydraulically balanced relieving the packing and other parts of distortion and greatly reducing the frictional resistance to relative movement of the joint parts. The joint is well adapted for use in situations where there is a necessity for relative movement between the fluid handling elements of the system. The joint is extremely simple requiring a minimum number of parts.

Having described a typical form of the invention, we do not wish to be limited to the specific details herein set forth, but wish to reserve to ourselves any variations or modifications that may appear to those skilled in the art or fall within the scope of the following claims.

We claim as our invention:

1. A fluid conducting joint including a socket unit, a ball unit in the socket unit, the two units being related for relative universal movement, a tubular fluid conducting member related to one of said units for relative axial movement, the assembly of the two units having a fluid passage in communication with the interior of the member, means dividing the ball surface into substantially equal and opposed areas subjected respectively to internal fluid and external atmospheric pressures and oppositely disposed relative to normal pressures acting on the ball, means for substantially balancing the axial fluid pressures on the member including walls in the ball defining a chamber having one end in communication with the atmosphere through the space on the ball subjected thereto and one end in communication with the interior of the member and with the surface of the ball subjected to internal fluid pressure, and a piston on the member operable in the chamber.

2. A fluid conducting joint including a socket unit, a ball unit in the socket unit, the two units being related for relative universal movement, a tubular fluid conducting member related to one of said units for relative axial movement, the assembly of the two units having a fluid passage in communication with the interior of the member, means dividing the ball surface into substantially equal and opposed enclosed areas subjected respectively to internal fluid and external atmospheric pressures and oppositely disposed relative to normal pressures acting on the ball, means for substantially balancing the axial fluid pressures on the member including walls in the ball defining a chamber having one end in communication with the atmosphere through the space on the ball subjected thereto and one end in communication with the interior of the member and with the surface of the ball subjected to internal fluid pressure, and a piston on the member operable in the chamber.

3. A fluid conducting joint including a socket unit, a ball unit in the socket unit, the two units being related for relative universal movement, a tubular fluid conducting member related to one of said units for relative axial movement, the assembly of the two units having a fluid passage in communication with the interior of the member, means dividing the ball surface into substantially equal and opposed enclosed balancing zones subjected respectively to internal fluid and external atmospheric pressures, said zones being oppositely disposed relative to normal pressures acting on the ball and means for substantially balancing the axial fluid pressures on the member including walls in one unit defining a cylinder chamber having one end in communication with the atmosphere and one end in communication with the member, and a piston on the exterior of the member operating in the chamber.

ELGEN B. GIBSON, JR.
DONALD W. BLAKEMAN.

REFERENCES CITED

The following references are of record in the file of this patent:

UNITED STATES PATENTS

| Number | Name | Date |
| --- | --- | --- |
| 1,034,965 | Bradley | Aug. 6, 1912 |
| 2,329,369 | Haver | Sept. 14, 1943 |
| 915,502 | Struer | May 16, 1909 |
| 959,378 | O'Neill | May 24, 1910 |

FOREIGN PATENTS

| Number | Country | Date |
| --- | --- | --- |
| 2,007 | Great Britain | Jan. 28, 1896 |